Patented Dec. 16, 1947

2,432,642

UNITED STATES PATENT OFFICE 2,432,642

CATALYTIC VAPOR PHASE OXIDATION OF NICOTINE TO 3,2'-NICOTYRINE

Charles F. Woodward, Abington, Charles O. Badgett, Glenside, and Paul G. Haines, Philadelphia, Pa., assignors to the United States of America, as represented by the Secretary of Agriculture No Drawing. Application May 17, 1943, Serial No. 487,258

3 Claims. (Cl. 260—291)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to the derivatives of nicotine and in particular to a process for the oxidation of nicotine to intermediate products such as 3,2'-nicotyrine [N-methyl-(3-pyridyl)-2-pyrrole].

Several previously reported methods for the preparation of 3,2'-nicotyrine from nicotine have involved the use of silver oxide, silver acetate, or alkaline calcium ferricyanide in the liquid phase. Also, 3,2'-nicotyrine has been obtained by the electrolytic oxidation of nicotine. Further, nicotine can be dehydrogenated to 3,2'-nicotyrine in the vapor phase in the presence of platinum- or palladium-on-asbestos. The latter catalyst is also suitable for liquid phase dehydrogenation of nicotine.

We have found that 3,2'-nicotyrine can be obtained in good yields by the catalytic oxidation of nicotine in the vapor phase with gases containing free oxygen, such as air, if experimental conditions such as reaction temperature, space velocity, and molar air/nicotine ratio are appropriately adjusted. Our invention relates specifically to this manner of producing 3,2'-nicotyrine, and has for its object the production of nicotine derivatives such as 3,2'-nicotyrine, by a catalytic vapor phase partial oxidation of nicotine.

We accomplish the oxidation by passing nicotine, in admixture with a gas containing free oxygen, over catalytic agents at temperatures suitable for mantaining the reactants and reaction products in the vapor state. Gaseous mixtures of nicotine and air are preferable but the oxygen content of the reacting mixture may be suitably varied by addition of free oxygen or nitrogen to the air-nicotine mixture. The 3,2'-nicotyrine thus formed is then recovered from the reaction products.

We have found that nicotine is readily oxidized to 3,2'-nicotyrine when a gaseous mixture of air and nicotine is conducted over a catalytic agent at a temperature of about 300° to 500° C. The molar air/nicotine ratio may be varied between 4.4 and 32.2. The amount of 3,2'-nicotyrine produced by the catalytic vapor phase oxidation of nicotine is also dependent upon the space velocity maintained during the oxidation. The term "space velocity," as used herein, means the ratio of the volume of gaseous reactants at reaction temperature per hour to the volume of catalyst employed. The volume of gaseous reactants was calculated on the basis of the quantity of air and nicotine passed over the catalyst without consideration of reaction products. Good yields of 3,2'-nicotyrine are obtained with space velocity variations of 3500 to 5050. It is to be understood, however, that when a reaction yield is dependent upon at least three variables such as air/nicotine ratio, space velocity, and reaction temperature, the range of any one variable can possibly be extended beyond the limits herein disclosed by appropriate adjustment of one or more of the other variables.

Porous vanadium oxide of 4-6 mesh particle size is an effective catalyst for our process. In a series of experimental runs, we found that, in addition to the initial desired effectiveness, this catalyst suffered no loss in activity. We have also found that vanadium oxide is an effective catalyst when deposited on a siliceous carrier such as kaolin.

In the example set forth below, illustrating our invention, the following equipment and technique were used. The catalyst was maintained in a vertical iron reactor. The gaseous mixture of air and nicotine was passed down through an iron tube which served as a preheater and thence upward through the catalyst bed. The iron preheater-reactor was a compact unit which was immersed in a molten nitrate salt bath. This molten medium not only insured uniform heating of the preheater-reactor unit, but was also effective in controlling the reaction exotherm. After passage through the catalyst bed, the reaction products were conducted in turn through a water-cooled condenser, an ice-cooled receiver, an electrical precipitator, a second water-cooled condenser, and finally through a trap immersed in a dry ice bath. The condensate was rectified by distillation under sub-atmospheric pressure. The nicotyrine fraction thus obtained from the reaction products was identified by its boiling point and by the melting point of a picric acid derivative. This latter compound melted at about 168–169° C. and a mixed melting point with an authentic specimen of nicotyrine picrate showed no melting point depression. The formation of nicotyrine by the above-disclosed process was thereby established.

Example 1

The catalyst consisted of 100 cc. porous vanadium oxide of 4 to 6 mesh particle size. A gaseous mixture of 60.9 grams (0.37 mole) nicotine and 3.7 moles air was passed over the catalyst at about 325° C. at a uniform rate over a period of 2 hours. The condensed reaction products were purified by fractional distillation at sub-atmospheric pressure. A good yield of the fraction boiling at 150–157.5° C./22 mm. or 137° C./7 mm. was obtained. This fraction yielded a picric acid derivative which after several recrystallizations from water melted at 168–169° C. There was no depression in the melting point when this picric acid derivative was mixed with an authentic specimen of 3,2'-nicotyrine picrate.

Example 2

The catalyst consisted of 80 cc. porous vanadium oxide of 4 to 6 mesh particle size. A gaseous mixture of 48.9 grams (0.30 mole) nicotine and 6.5 moles air was passed over the catalyst at about 450° C. at a uniform rate over a period of 1 hour. Nicotyrine was isolated from the reaction products and identified as in Example 1.

Example 3

The catalyst consisted of vanadium oxide on acid-treated kaolin. 100 cc. of this catalyst of 4 to 6 mesh particle size was employed. A gaseous mixture of 250 grams (1.54 moles) nicotine and 12.5 moles air was passed over the catalyst at about 450° C. at a uniform rate over a period of 100 minutes. 3,2'-nicotyrine was isolated from the reaction products and identified as in Example 1.

Example 4

The catalyst consisted of 100 cc. of fused vanadium oxide of 4 to 6 mesh particle size. A gaseous mixture of 200 grams (1.23 moles) nicotine and 10 moles air was passed over the catalyst at about 450° C. at a uniform rate over a period of 80 minutes. 3,2'-nicotyrine was isolated from the reaction products and identified as in Example 1.

Having thus described our invention, we claim:

1. A process of preparing 3,2'-nicotyrine comprising passing nicotine in admixture with air in a molar air/nicotine ratio of from 4.4 to 32.2 over vanadium oxide at a temperature of from 300° to 500° C. and a space velocity of from 3500 to 5050, and recovering 3,2'-nicotyrine from the reaction products.

2. A process of preparing 3,2'-nicotyrine comprising passing nicotine in admixture with air in a molar air/nicotine ratio of from 4.4 to 32.2 over vanadium oxide at a temperature of from 300° to 500° C. and a space velocity of from 3500 to 5050, and frictionally distilling the formed 3,2'-nicotyrine from the reaction products.

3. A process of preparing 3,2'-nicotyrine comprising passing nicotine in admixture with air in a molar air/nicotine ratio of from 4.4 to 32.2 over vanadium oxide at a temperature of from 300° to 500° C. and a space velocity of from 3500 to 5050, distilling the reaction products, and collecting the formed 3,2'-nicotyrine boiling at 150–157.5° C./22 mm.

CHARLES F. WOODWARD.
CHARLES O. BADGETT.
PAUL G. HAINES.

REFERENCES CITED

The following references are of record in the file of this patent:

Chemical Abstracts, Wibaut, vol. 23, p. 148 (1929).

Sabatier, p. 674, "Catalysis in Organic Chemistry" (1923) D. Van Nostrand & Co., N. Y.